US011687096B1

(12) United States Patent
Gariepy et al.

(10) Patent No.: US 11,687,096 B1
(45) Date of Patent: Jun. 27, 2023

(54) SYSTEMS AND METHODS FOR FLEXIBLE MANUFACTURING USING SELF-DRIVING VEHICLES

(71) Applicant: CLEARPATH ROBOTICS INC., Kitchener (CA)

(72) Inventors: Ryan Christopher Gariepy, Kitchener (CA); Andrew Dobson, Kitchener (CA); Nir Rikovitch, Kitchener (CA); William John Alexander Torrens, Kitchener (CA); Roydyn Clayton, Seattle, WA (US)

(73) Assignee: CLEARPATH ROBOTICS INC., Kitchener (CA)

( * ) Notice: Subject to any disclaimer, the term of this patent is extended or adjusted under 35 U.S.C. 154(b) by 0 days.

(21) Appl. No.: 18/079,442

(22) Filed: Dec. 12, 2022

Related U.S. Application Data

(63) Continuation of application No. 17/153,133, filed on Jan. 20, 2021, now Pat. No. 11,556,136, which is a
(Continued)

(51) Int. Cl.
*G05D 1/02* (2020.01)
*G05B 19/418* (2006.01)

(52) U.S. Cl.
CPC ..... *G05D 1/0291* (2013.01); *G05B 19/41895* (2013.01); *G05D 1/0297* (2013.01);
(Continued)

(58) Field of Classification Search
CPC ............... G05D 1/0291; G05D 1/0297; G05D 2201/0216; G05B 19/41895;
(Continued)

(56) References Cited

U.S. PATENT DOCUMENTS

| 3,968,559 A | 7/1976 | Karlsson |
| 5,091,855 A | 2/1992 | Umehara et al. |

(Continued)

FOREIGN PATENT DOCUMENTS

| DE | 102009024195 A1 | 12/2010 |
| DE | 102010030764 A1 | 1/2012 |

(Continued)

OTHER PUBLICATIONS

Milberg et al.; Integration of Autonomous Mobile Robots into the Industrial Production Environment; Proc. 1987 IEEE Intl. Conf. on Robotics and Automation; Raleigh, NC; 1987; pp. 1953-1959 (Year: 1987).*

(Continued)

*Primary Examiner* — Michael J Zanelli

(57) ABSTRACT

Systems and methods for flexible conveyance in an assembly-line or manufacturing process are disclosed. A fleet of self-driving vehicles and a fleet-management system can be used to convey workpieces through a sequence of workstations at which operations are performed in order to produce a finished assembly. An assembly can be transported to a first workstation using a self-driving vehicle, where an operation is performed on the assembly. Subsequently, the assembly can be transported to a second workstation using the self-driving vehicle. The operation can be performed on the assembly while it is being conveyed by the self-driving vehicle.

20 Claims, 7 Drawing Sheets

Related U.S. Application Data continuation of application No. 15/936,880, filed on Mar. 27, 2018, now Pat. No. 10,928,835.

(60) Provisional application No. 62/477,108, filed on Mar. 27, 2017.

(52) U.S. Cl.
CPC .............. *G05B 2219/50393* (2013.01); *G05D 2201/0216* (2013.01); *Y02P 90/02* (2015.11)

(58) Field of Classification Search
CPC .... G05B 19/41805; G05B 2219/50393; G05B 2219/32388; Y02P 90/02; Y02P 90/60
See application file for complete search history.

(56) References Cited

U.S. PATENT DOCUMENTS

| | | | |
|---|---|---|---|
| 6,057,779 | A | 5/2000 | Bates |
| 6,505,093 | B1 | 1/2003 | Thatcher et al. |
| 7,894,933 | B2 | 2/2011 | Mountz et al. |
| 7,931,197 | B2 | 4/2011 | Brandt et al. |
| 7,991,505 | B2 | 8/2011 | Lert, Jr. et al. |
| 8,010,220 | B1 | 8/2011 | Ames et al. |
| 8,311,905 | B1 | 11/2012 | Campbell et al. |
| 8,666,546 | B2 | 3/2014 | Sarh et al. |
| 9,014,902 | B1 | 4/2015 | Murphy |
| 9,486,917 | B2 | 11/2016 | Reid et al. |
| 9,733,646 | B1 | 8/2017 | Nusser et al. |
| 10,304,027 | B1 | 5/2019 | Haque |
| 11,468,400 | B1 | 10/2022 | Kumar et al. |
| 2003/0105552 | A1 | 6/2003 | Lunak et al. |
| 2004/0193314 | A1 | 9/2004 | Tilles et al. |
| 2006/0074778 | A1 | 4/2006 | Katou et al. |
| 2008/0319574 | A1 | 12/2008 | Wilke |
| 2009/0326971 | A1 | 12/2009 | Piccinini et al. |
| 2011/0282476 | A1 | 11/2011 | Hegemier et al. |
| 2012/0101627 | A1 | 4/2012 | Lert |
| 2013/0235191 | A1 | 9/2013 | Miao et al. |
| 2014/0074287 | A1 | 3/2014 | Lafary et al. |
| 2014/0100769 | A1 | 4/2014 | Wurman et al. |
| 2014/0172223 | A1 | 6/2014 | Murphy |
| 2014/0365258 | A1 | 12/2014 | Vestal et al. |
| 2015/0314890 | A1 | 11/2015 | Desjardien et al. |
| 2016/0011593 | A1 | 1/2016 | Oberoi et al. |
| 2016/0101940 | A1 | 4/2016 | Grinnell et al. |
| 2016/0124434 | A1 | 5/2016 | Gariepy et al. |
| 2017/0236082 | A1 | 8/2017 | Davidson et al. |
| 2017/0330138 | A1 | 11/2017 | Stoeckel et al. |
| 2018/0029178 | A1 | 2/2018 | Thorwarth |
| 2018/0150794 | A1 | 5/2018 | Ho et al. |
| 2019/0179329 | A1 | 6/2019 | Keivan et al. |
| 2019/0250641 | A1 | 8/2019 | Beer et al. |
| 2020/0130115 | A1 | 4/2020 | Vetter et al. |
| 2021/0395012 | A1 | 12/2021 | Liu et al. |

FOREIGN PATENT DOCUMENTS

| | | |
|---|---|---|
| WO | 0125796 A1 | 4/2001 |
| WO | 2011096813 A1 | 8/2011 |
| WO | 2016012742 A1 | 1/2016 |

OTHER PUBLICATIONS

International Search Report and Written Opinion dated Jul. 10, 2018 in related International Patent Application No. PCT/IB2018/052100 (9 pages).

Boca et al.;Ultra-Flexible Production Systems for Automated Factories; 2016 IEEE International Conference on Automation Science and Engineering (CASE) Fort Worth, TX, USA, Aug. 21-24, 2016; pp. 614-619 (Year: 2016).

* cited by examiner

SYSTEMS AND METHODS FOR FLEXIBLE MANUFACTURING USING SELF-DRIVING VEHICLES

CROSS-REFERENCE TO RELATED APPLICATIONS

This application is a continuation of U.S. patent application Ser. No. 14/153,133, filed Jan. 20, 2021, which is a continuation of U.S. patent application Ser. No. 15/936,880, filed Mar. 27, 2018, which claims priority from U.S. Provisional Patent Application No. 62/477,108, filed Mar. 27, 2017. The entirety of each of U.S. patent application Ser. No. 17/153,133, U.S. patent application Ser. No. 15/936,880, and U.S. Provisional Patent Application No. 62/477,108 is hereby incorporated by reference.

FIELD

The described embodiments relate to the conveyance of workpieces through an industrial assembly process, and, in particular, to flexible conveyance using self-driving vehicles.

BACKGROUND

Typical industrial assembly processes are carried out using an assembly line along which a workpiece is moved through a sequence of stages in the assembly process. Assembly lines require conveyance infrastructure that is fixed to a manufacturing facility, such as a conveyor belt or chain conveyor installed in a factory floor, or an overhead chain conveyor. In some cases, human-operated forklifts and cranes may be used to supplement the conveyor, for example, by moving a workpiece from the end of one conveyor to the start of another.

An alternative to a typical assembly line has been suggested in U.S. Pat. No. 8,798,787 to Fuhlbrigge et al., titled "Ultra-Flexible Production Manufacturing". The systems and methods of Fuhlbrigge et al. rely on mobile-transport units to deliver a workpiece to a work cell, where an operation is performed on the workpiece. Subsequent to the operation, another mobile-transport unit picks up the workpiece and delivers it to a subsequent work cell or other location. This scheme requires that a separate round trip be made by a mobile-transport unit for each work-cell operation that is performed on a workpiece. Furthermore, each round trip is executed on an on-demand basis, meaning that the pick-up and delivery of a workpiece at a subsequent work cell or location is only triggered when the operation at one work cell has been completed.

Known systems for conveying workpieces through an assembly line represent an inefficient use of conveyance infrastructure, since they require inflexible infrastructure that is installed in a facility, or they make inefficient use of mobile-transport units. With respect to the use of mobile-transport units, known systems represent significant complexity for the scheduling of the mobile-transport units due to the need for a round trip for each stage of the assembly line, therefore adding to the complexity and uncertainty of the assembly line process. Furthermore, storing workpieces at a work cell until the work cell is available creates uncertainties in the production time for the workpiece. These complexities and uncertainties are exasperated by assembly lines in which a particular sequence of unique finished goods is required.

SUMMARY

In one aspect, there is a method for flexible conveyance in an assembly process. An assembly is transported to a first workstation using a self-driving vehicle. And an operation is performed on the assembly at the first workstation. Subsequently, the assembly is transported to a second workstation using the self-driving vehicle. The assembly remains on the self-driving vehicle while the operation is performed.

According to some embodiments, the method further comprises the initial step of receiving a mission based on the first workstation and the second workstation with the self-driving vehicle.

According to some embodiments, the mission comprises a first waypoint corresponding to the first workstation and a second waypoint corresponding to the second workstation. Transporting the assembly to the first workstation comprises using the vehicle to plan a path to the first waypoint, and transporting the assembly to the second workstation comprises using the vehicle to plan a second path to the second waypoint.

According to some embodiments, the mission further comprises a first travel speed corresponding to the first workstation, and transporting the assembly to the first workstation comprises transporting the assembly at the first travel speed.

According to some, embodiments, transporting the assembly to the first work station comprises using a sensor on the vehicle to detect an obstruction in the first path, stopping the vehicle in response to the obstruction, subsequently using the sensor to detect that the obstruction is not in the first path, and continuing to transport the assembly to the first work station.

According to some embodiments, the method further comprises measuring the duration of time for which the vehicle is stopped in response to the obstruction, and continuing to transport the assembly by accelerating the vehicle to a speed based on the measured duration of time.

According to some embodiments, there is a first assembly and a second assembly, and a first operation to be performed on the first assembly and a second operation to be performed on the second assembly. Subsequent to transporting the first assembly to the first workstation using the first vehicle, the second assembly is transported to the first workstation using the second vehicle. The first operation is then performed on the second assembly at the first work station, and a second operation is performed on the first assembly at the second workstation. Then, the second assembly is transported to the second workstation using the second self-driving vehicle, and the first assembly is transported to a third workstation using the first self-driving vehicle.

According to some embodiments, the method further comprises receiving assembly-plan information from the first workstation and/or the second workstation, and updating the mission based on the assembly-plan information.

In one aspect, there is a method for flexible conveyance in an assembly process. A request for assemblies to be assembled is received, and a sequence of operations to be performed on each assembly is received. For each operation to be performed, a workstation waypoint is determined. For each assembly, a list of workstation waypoints is generated. An assembly-input sequence is generated, and, for each assembly, a mission is generated.

According to some embodiments, the assembly-input sequence is based on the list of workstation waypoints.

According to some embodiments, a work period is determined for at least one operation to be performed.

According to some embodiments, the assembly-input sequence is generated based on the work period.

According to some embodiments, a vehicle work speed is determined for at least one operation.

According to some embodiments, at least one mission comprises the vehicle work speed.

According to some embodiments, for each operation, an estimated completion time is generated.

According to some embodiments, the assembly-input sequence is generated based on the estimated completion time of each operation.

According to some embodiments, the assembly-input sequence is generated based on the estimated completion time of each operation.

According to some embodiments, the request for assemblies is received by a fleet-management system from an enterprise resource planning system.

According to some embodiments, for each vehicle, a mission is executed that corresponds to the vehicle.

According to some embodiments, for each mission, a corresponding vehicle is selected from a fleet of vehicles.

According to some embodiments, for each vehicle, a corresponding mission is assigned.

In one aspect, there is a system for flexible conveyance in an assembly process. The system comprises a plurality of workstations, a fleet-management system, and at least one self-driving material-transport vehicle carrying an assembly. The plurality of workstations has a first workstation for performing a first operation and a second workstation for performing a second operation. A processor of the fleet-management system is configured to receive a request for the assembly to be assembled according to a sequence of workstations, generate a mission based on the sequence of workstations, and transmit the mission to the vehicle. A processor of the vehicle is configured to receive the mission from the fleet-management system, and plan at least one path for the vehicle to the first workstation and subsequently to the second workstation. The first operation is performed on the assembly at the first workstation and the second operation is performed on the assembly at the second workstation while the assembly is carried on the vehicle.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
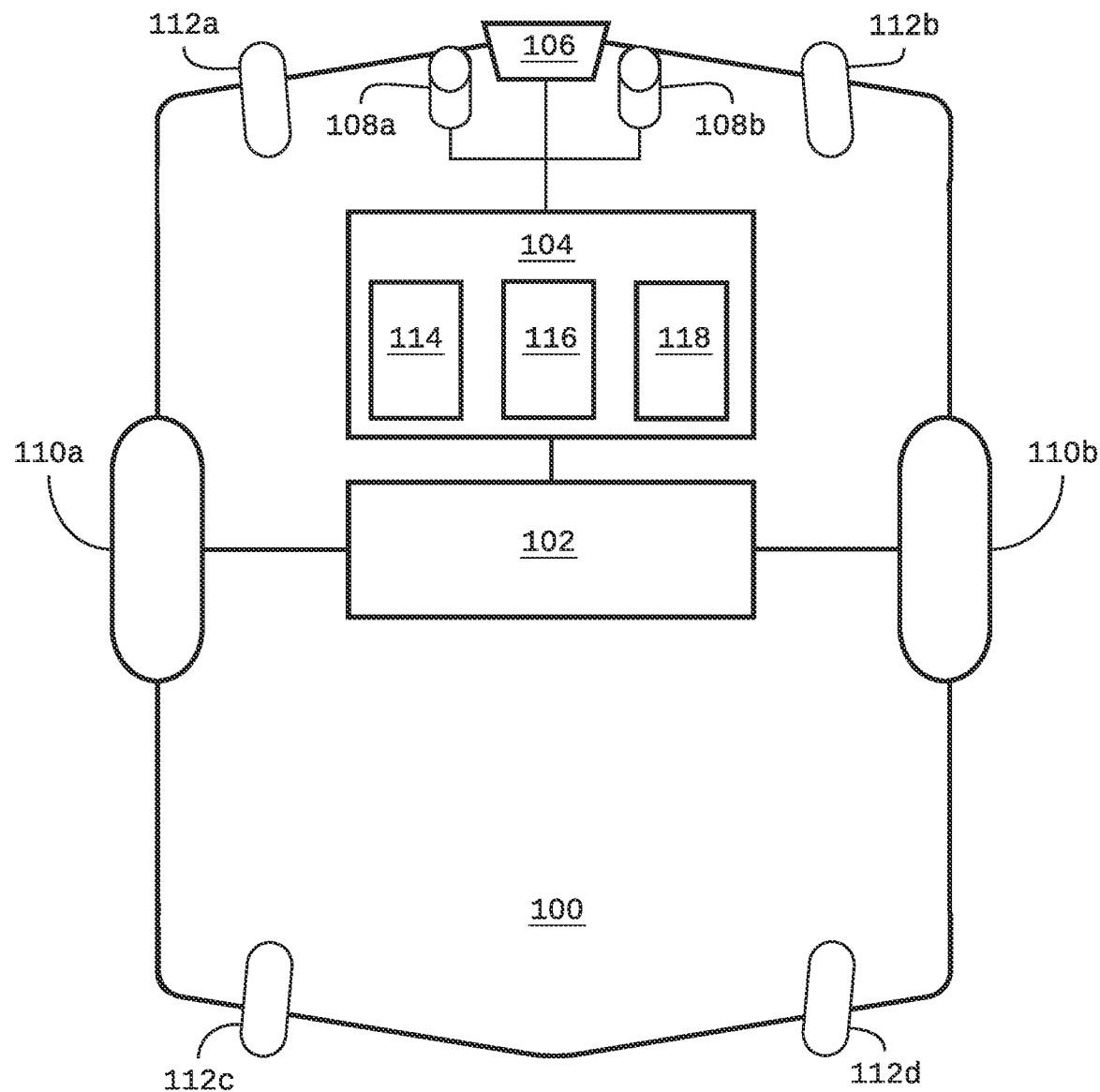
FIG. 1 is a system diagram of a self-driving material-transport vehicle, according to some embodiments.

Referring to FIG. 1, there is shown a self-driving material-transport vehicle 100 according to some embodiments. The vehicle comprises a drive system 102, a control system 104, and one or more sensors 106, 108a, and 108b.

The drive system 102 includes a motor and/or brakes connected to drive wheels 110a and 110b for driving the vehicle 100. According to some embodiments, the motor may be an electric motor, combustion engine, or a combination/hybrid thereof. Depending on the particular embodiment, the drive system 102 may also include control interfaces that can be used for controlling the drive system 102. For example, the drive system 102 may be controlled to drive the drive wheel 110a at a different speed than the drive wheel 110b in order to turn the vehicle 100. Different embodiments may use different numbers of drive wheels, such as two, three, four, etc.

According to some embodiments, additional wheels 112 may be included (as shown in FIG. 1, the wheels 112a, 112b, 112c, and 112d may be collectively referred to as the wheels 112). Any or all of the additional wheels 112 may be wheels that are capable of allowing the vehicle 100 to turn, such as castors, omni-directional wheels, and mecanum wheels.

The control system 104 comprises a processor 114, a memory 116, and a computer-readable non-transitory medium 118. According to some embodiments, the control system 104 may also include a communications transceiver (not shown in FIG. 1), such as a wireless transceiver for communicating with a wireless communications network (e.g. using an IEEE 802.11 protocol or similar).

One or more sensors 106, 108a, and 108b may be included in the vehicle 100. For example, according to some embodiments, the sensor 106 may be a LIDAR device (or other optical/laser, sonar, or radar range-finding sensor). The sensors 108a and 108b may be optical sensors, such as video cameras. According to some embodiments, the sensors 108a and 108b may be optical sensors arranged as a pair in order to provide three-dimensional (e.g. binocular or RGB-D) imaging.

The control system 104 uses the medium 118 to store computer programs that are executable by the processor 114 (e.g. using the memory 116) so that the control system 104 can provide automated or autonomous operation to the vehicle 100. Furthermore, the control system 104 may also store an electronic map that represents the known environment of the vehicle 100, such as a manufacturing facility, in the media 118.

For example, the control system 104 may plan a path for the vehicle 100 based on a known destination location and the known location of the vehicle. Based on the planned path, the control system 104 may control the drive system 102 in order to drive the vehicle 100 along the planned path. As the vehicle 100 is driven along the planned path, the sensors 106, and/or 108a and 108b may update the control system 104 with new images of the vehicle's environment, thereby tracking the vehicle's progress along the planned path and updating the vehicle's location. In other embodiments, the control system 104 may rely in part or in whole on a user-defined path.

Since the control system 104 receives updated images of the vehicle's environment, and since the control system 104 is able to autonomously plan the vehicle's path and control the drive system 102, the control system 104 is able to determine when there is an obstacle in the vehicle's path, plan a new path around the obstacle, and then drive the vehicle 100 around the obstacle according to the new path.

According to some embodiments, the vehicle 100 may receive a mission from a fleet-management system or other external computer system in communication with the vehicle 100 (e.g. in communication via the transceiver in the control system 104). In this case, the mission contains one or more waypoints or destination locations. Based on the waypoint or destination location contained in the mission, the vehicle 100, based on the control system 104, can autonomously navigate to the waypoint or destination location without receiving any other instructions from an external system. For example, the control system 104, along with the sensors 106, and/or 108a, and 108b, enable the vehicle 100 to navigate without any additional navigational aids such as navigational targets, magnetic strips, or paint/tape traces installed in the environment in order to guide the vehicle 100.

Figure 2:
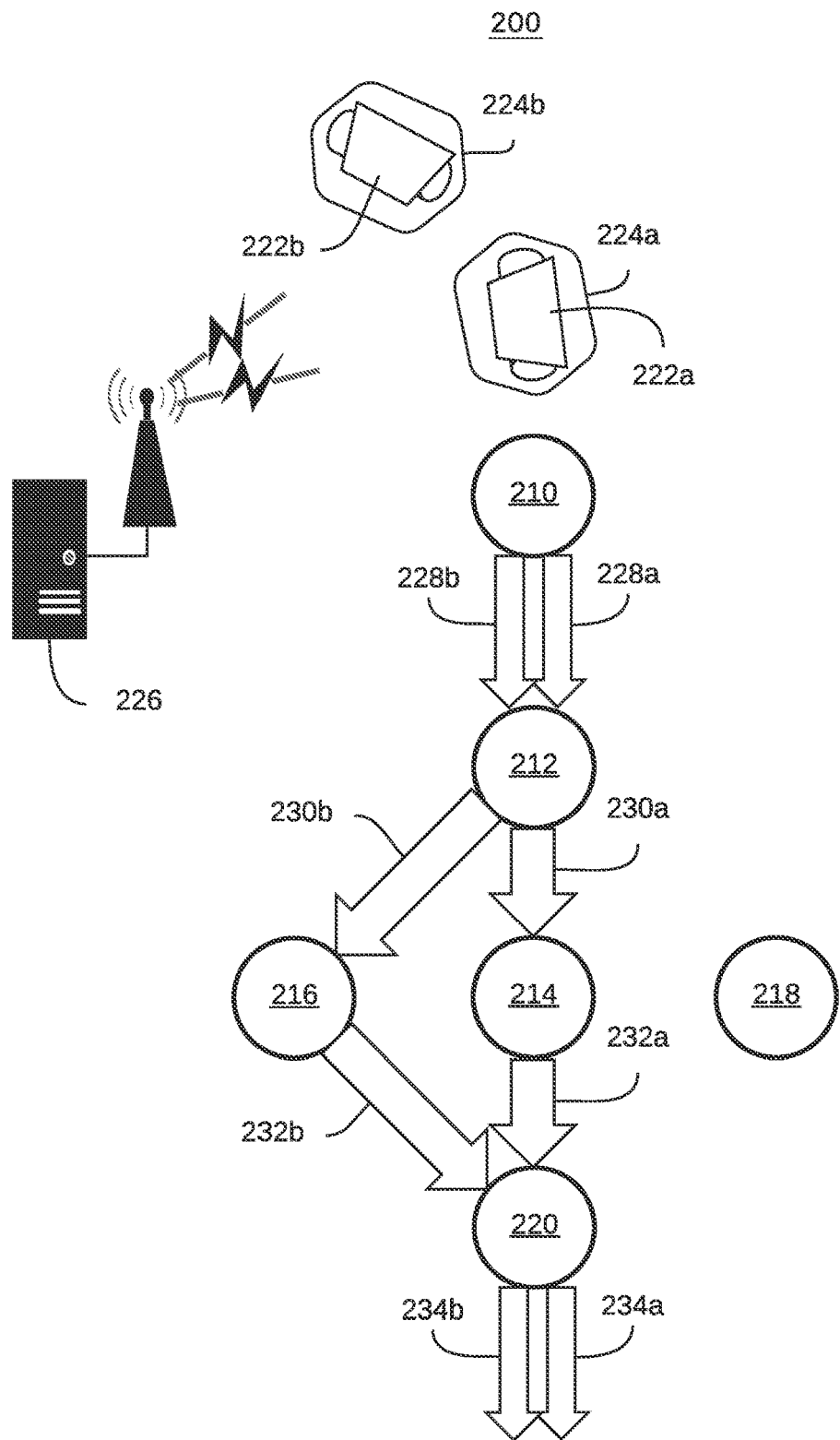
FIG. 2 is a plan view of an assembly facility using a system for flexible conveyance according to some embodiments.

Referring to FIG. 2, there is shown a manufacturing facility 200 in which an assembly line has been established by implementing workstations 210, 212, 214, 216, 218, and 220. As used herein, the term "assembly line" does not necessarily refer to a typical or traditional assembly line, since it does not require any permanently-installed infrastructure for conveying workpieces such as a conveyor belt or chain. Rather, "assembly line" generally refers to a series of assembly stages (e.g. workstations and associated operations) used to assemble a finished assembly.

The assembly line relies on the conveyance of workpieces 222a and 222b through a sequence of workstations by self-driving material-transport vehicles 224a and 224b respectively. At each workstation, an operation is performed on the workpieces 222a and 222b. While moving from one work station to the next, the workpieces may be considered "semi-finished" workpieces, until the operation at the final workstation is completed, at which point they may be considered "final" workpieces, That is, each operation provides an assembly stage towards producing the final workpiece. As used herein, a "workpiece" may also be referred to as an "assembly".

Each work station may be occupied by any combination of human operators and automated assembly equipment for performing the operation on the workpiece. Furthermore, according to some embodiments, parts may be supplied to each workstation, for example, using systems and methods for lineside delivery (such as autonomous lineside delivery) or using systems and methods for provision replenishment (such as autonomous provision replenishment).

An example of autonomous lineside delivery is provided in U.S. Patent Application No. 62/477,047 filed on 27 Mar. 2017 and entitled "Systems and Methods for Autonomous Lineside Parts Delivery to an Assembly Line Process", which is herein incorporated by reference for all purposes. An example of autonomous provision replenishment is provided in U.S. Patent Application No. 62/476,960 filed on 27 Mar. 2017 and entitled "Systems and Methods for Autonomous Provision Replenishment", which his herein incorporate by reference for all purposes.

An example is illustrated in FIG. 2 using two vehicles 224a and 224b transporting, in sequence, workpieces 222a and 222b through respective sequences of workstations. According to some embodiments, there is no limit to the number of vehicles and/or workpieces that can be used, and any number may be implement, for example, by continuously operating the assembly process to continuously produce finished workpieces. Similarly, there is no limit to the number of operations or workstations. The topology depicted in FIG. 2 may represent an entire assembly process, or a part of an assembly process.

The vehicle 224a and the vehicle 224b enter the assembly process in sequence, with the vehicle 224a arriving at the first workstation 210 prior to the vehicle 224b. According to some embodiments, a work period associated with the operation being performed at the workstation 210 can be used as an estimate for the time expected for the vehicle 224a to remain at the workstation 210. Based on the work period associated with 210, the vehicle 224b can be spaced appropriately behind the vehicle 224a so that it arrives at the workstation 210 according to the time at which the vehicle 224a is expected to depart the workstation 210. In other words, as depicted in FIG. 2, the vehicles 224a and 224b arrive at the first workstation 210 according to an assembly-input sequence. According to some embodiments, the vehicles may be spaced in the assembly-input sequence based on a work period. According to some embodiments, the vehicles may be spaced in the assembly-input sequence based on a defined physical spacing or separation distance.

In the example shown, the semi-finished workpieces 222a and 222b are intended to be assembled into different finished workpieces. As used in FIG. 2, the nomenclature 'a' is used in association with one type of finished assembly (e.g. a particular sequence of operations performed on a workpiece), and 'la' is used in association with another.

Each of the workpieces 222a and 222b is to be assembled according to its own sequence of operations. For example, as shown, the workpiece 222a is to be assembled by the operations that are performed at workstations 210, 212, 214, and 220, and the workpiece 222b is to be assembled by the operations that are performed at workstations 210, 212, 216, and 220. In other words, the finished workpieces will differ only in that one went underwent an operation at workstation 216, while the other underwent a different operation at workstation 218. For example, if the workpieces are automobiles, then the workstation 214 may be where an automatic transmission is installed, whereas the workstation 216 may be where a manual transmission is installed.

According to some embodiments, the particular sequence of operations used to generate a particular finished workpiece may be indicated on the workpiece itself. For example, a workpiece may be associated with an assembly plan, which may be indicated, for example, by a bar code, QR code, RFID tag, etc. In this case, when a vehicle receives the workpiece in order to convey it through the assembly process, the vehicle may scan the assembly plan, for example, using a bar-code scanner, QR code scanner, RFID reader, etc. on the vehicle. In this way, a vehicle may obtain any or all of a sequence of operations, a sequence of workstations, and a sequence of waypoints required to produce a finished assembly, for example, without the need for other infrastructure.

According to some embodiments, the particular sequence of operations used to generate a particular finished workpiece may be received by a fleet-management system 226. According to some embodiments, the sequence of operations may be provided by an enterprise resource planning system or other assembly-management system. For ease of illustration, all of these systems are generally indicated by, the fleet-management system 226, though, in some cases, each system may be a discrete system in communication with the other systems The fleet-management system 226 has a processor, memory, non-transitory computer-readable media, and a transceiver (e.g. a wireless transceiver) for communicating with a communications network. The fleet-management system 226 uses the media to store computer programs that are executable by the processor (e.g. using the memory) so that the fleet-management system 226 can communicate information with other system, and communicate with the self-driving vehicles 224a and 224b. The fleet-management system 226 can communicate with an enterprise resource planning system or other assembly-management systems (hereafter collectively referred to as an enterprise resource planning system).

Any or all of the vehicles, the fleet-management system 226, and the enterprise resource planning system (and other systems) may communicate using known telecommunications protocols and methods. For example, each vehicle and system may be equipped with a wireless transceiver to enable wireless communications according to a WiFi protocol (e.g. IEEE 802.11 protocols).

According to some embodiments, the fleet-management system may also receive a sequence of finished assemblies to be produced, and/or a list of finished assemblies to be produced during a particular period of time (e.g. a work shift, a day, a week, etc.).

A finished workpiece can be thought of as a workpiece assembled according to a particular sequence of operations, where each operation is associated with one or more workstations. As such, in some embodiments, the fleet-management system 226 may initially receive a sequence of operations to be performed, whereas, in other embodiments, the fleet-management system 226 may receive a sequence of workstations. According to some embodiments, more than one workstation may be available for performing a particular operation.

In the case that the fleet-management system 226 receives a sequence of operations, the fleet-management system 226 may obtain the workstations associated with each operation. For example, the fleet-management system 226 may include a look-up table or database that stores the associations between operations and/or workstations and/or workpieces, and/or the fleet-management system 226 may obtain these associations from another system such as an enterprise resource planning system.

According to some embodiments, the fleet-management system 226 can similarly obtain or determine waypoints associated with each workstation. A waypoint indicates a physical location associated with a workstation, which may be relevant, for example, to an electronic map of the facility 200 stored in the control system of a vehicle and/or in the fleet-management system 226.

In this way, the particular operation being performed at a workstation as well as the location of the workstation may be assigned or determined dynamically. For example, and in reference to FIG. 2, at one time, human operators and/or assembly equipment at workstation 214 may perform the operation of installing an automatic transmission, whereas, at workstations 216 and 218, the operation of installing a manual transmission may be performed. These assignments of operations to workstations may be made, for example, if it takes twice as long to install a manual transmission as is does an automatic transmission (i.e. the work period for manual transmission is twice as long as for automatic transmission). As such, by implementing two workstations 216 and 218 in parallel to install manual transmission, the longer work period associated with the operation does not have to hold up the entire assembly line, since, on average, the longer work period is distributed across more work stations (and thus the average time to install a manual transmission—the average work period divided by the number of workstations—is reduced). The work period may be affected by multiple factors. For example, some operations take longer to perform because they are more complicated. Some operations take longer to perform because they are new operations, and highly-efficient labor and/or equipment may not be available to perform the new operation.

In keeping with the above example, at a second point in time, the work period for the manual transmission installation operation has been reduced due to increased efficiencies obtained in performing the operation. However, at the same time, a third type of transmission—a continuously-variable transmission—is made available for installation in the automobiles being assembled. At this time, the workstation 218 can be reassigned from the operation of installing manual transmissions to the operation of installing continuously-variable transmissions. Furthermore, along with this change, the physical location of the workstation 218 may be moved within the facility 200.

For the sake of clarity, the term "vehicle" is used herein to identify a self-driving vehicle that conveys a workpiece, regardless of the type of workpiece, and the term "automobile" is used as an example of a particular type of workpiece (e.g. in an automobile assembly plant).

Once the fleet-management system 226 receives the sequence of operations to be performed on a particular workpiece (and/or a sequence of workstations and/or a sequence of waypoints), it obtains or determines the associated workstations and/or waypoints as necessary.

For each workpiece, the fleet-management system 226 may select or assign a particular vehicle (e.g. from within a fleet of vehicles) to convey the workpiece. Then, for each workpiece, the fleet-management system 226 generates a mission for the corresponding, vehicle in order to convey the workpiece through the necessary sequence of workstations in order to satisfy the necessary sequence of operations to be performed on the workpiece.

In an example shown in FIG. 2, the fleet-management system 226 generates a mission for the first vehicle 224*a* comprising a sequence of waypoints associated with the workstation sequence 210, 212, 214, and 220. Similarly, the fleet-management system 226 generates a mission for the second vehicle 224*b* comprising a sequence of waypoints associated with the workstation sequence 210, 212, 216, and 220.

According to some embodiments, for any given waypoint or workstation, the mission may include a command for the vehicle to stop so that an operation can be performed on the workpiece being conveyed by the vehicle. According to some embodiments, the mission may include a period of time for which the vehicle is to remain stopped at the workstation. According to some embodiments, the vehicle may remain stopped until a trigger or signal is provided to indicate that the operation is complete, for example, based on the operation of automated assembly equipment, information obtained from a sensor (e.g. vision system) monitoring the operation and/or assembly, or a manual input from a human operator.

According to some embodiments, for any given waypoint or workstation, the mission may include a vehicle-work speed associated with the waypoint or workstation. For example, the operation associated with the workstation may be a "continuously moving" operation. A continuously-moving operation may be accomplished, for example, by human operators who perform the operation on the assembly while walking along the vehicle as the vehicle travels at the vehicle-work speed. Similarly, the vehicle may travel at the vehicle-work speed through a larger machine that performs a series of steps in an operation as the workpiece is moved through the machine. In this case, a waypoint may be thought of as a location at which the vehicle starts to travel at a particular vehicle-work speed.

According to some embodiments, the fleet-management system 226 can measure and record the actual duration of time for which an operation was performed, or a vehicle remained at a waypoint or workstation.

Once the fleet-management system 226 generates the mission for each vehicle carrying a workpiece, the missions are transmitted to the respective vehicles. Based on the received missions, each vehicle can plan its own path based on the waypoints included in the mission.

In an example of FIG. 2, the first vehicle 224a plans a path to a waypoint associated with the workstation 210, and autonomously travels along its planned path. Then, according to the mission, the vehicle 224a either stops while the operation is performed at the workstation 210, or it travels at a vehicle-travel speed associated with the workstation 210 until the operation on the workpiece 222a is completed.

Subsequently, the vehicle 224a plans and travels along the path 228a to the workstation 212, the path 230a to the workstation 214, the path 232a to the workstation 220, and then the path 234a as a finished assembly (e.g. to a finished assembly packaging area, a loading dock, etc.).

Similarly, the second vehicle 224b plans and travels along similar paths such as the path 228b from the workstation 210 to the workstation 212. However, from the workstation 212, the vehicle 224b plans and travels along the path 230b to the workstation 216, and then along the path 232b to the workstation 220, before planning and traveling along the path 234b as a finished assembly.

Figure 3:
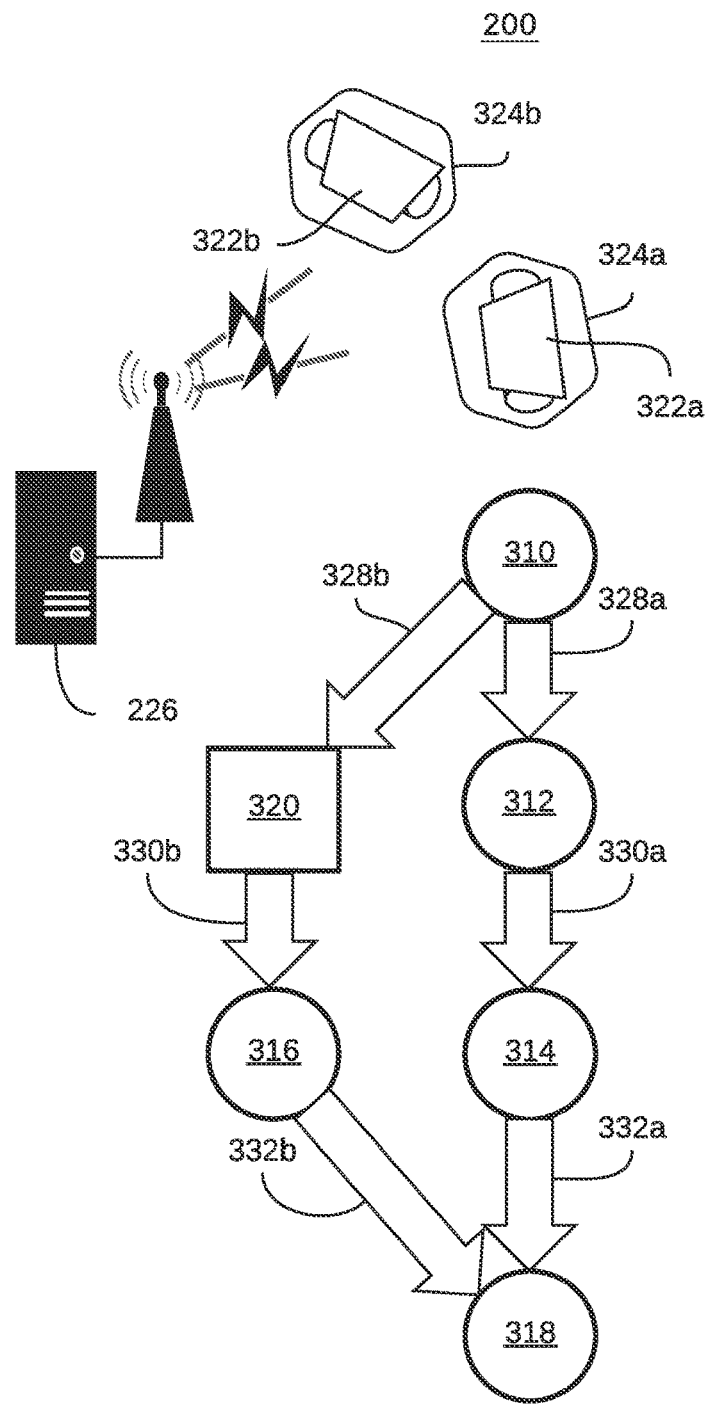
FIG. 3 is a plan view of the assembly facility of FIG. 2 using a system for flexible conveyance according to some embodiments.

Referring to FIG. 3, there is shown the manufacturing facility 200 in which an assembly line (or assembly process) has been established by implementing workstations 310, 312, 314, 316, and 318. The assembly line depicted in FIG. 3 may be in addition to the assembly line depicted in FIG. 2. For example, both assembly lines may be implemented at the same time, in different areas of the facility 200, and/or one assembly line may be implemented at one time, and then replaced with the other assembly line at another time. In addition to the workstations shown, the assembly line also includes a buffer station 320.

In an example depicted in FIG. 3, the fleet-management system 226 has received a sequence of finished assemblies to be produced, which specifies that the workpiece 322a is to be finished ahead of the workpiece 322b. The sequence of operations required to finish the assembly 322a requires that the vehicle 324a convey the workpiece 322a to waypoints associated with the workstations 310, 312, 314, and 318. The sequence of operations required to finish the assembly 322b requires that the vehicle 324b convey the workpiece 322b to waypoints associated with the workstations 310, 316, and 318. In other words, finishing the assembly 322b requires one workstation fewer than finishing the assembly 322a. For the sake of illustration, it can be assumed that, in the example, the work period for each workstation is approximately the same, and that, for each of the paths 328a, 328b, 330a, 332b, 332a, and 332b, the vehicles 324a and 324b would typically travel at the same speed (e.g. a default speed) if no speed has been specified by the fleet-management system 226.

In view of the above, the possibility exists that the workpieces 322a and 322b may be finished out of sequence, and/or that both workpieces could arrive at the workstation 318 at the same time, since the workpiece 322b requires one fewer workstation than the workpiece 322a. If, for example, the operation at workstation 316 is completed slightly faster than the average work period between workstations 312 and 314, then the vehicle 324b may arrive at the waypoint for workstation 318 slightly ahead of the vehicle 324a.

According to some embodiments, a single workstation may be designed to handle a single workpiece (and thus, a single vehicle) at a time, and, therefore, it could be problematic for two vehicles to arrive at essentially the same time, even if they are not out of sequence.

In order to address these concerns, the buffer station 320 is used to intentionally delay the vehicle 324b so that the sequence of workpieces can be maintained, and so that two vehicles 324a and 324b don't show up to the workstation 318 at the same time (or so that vehicle 324b doesn't arrive at the workstation 318 before the operation on the workpiece 322a has been completed and the vehicle 324a has vacated the waypoint associated with the workstation 318).

According to some embodiments, the buffer station 320 may be a location within the facility 200 that is physically designated as such. For example, lines may be placed on the floor of the facility 200, or other marks used, to indicate the buffer station 320. According to some embodiments, the buffer station 320 may be a virtual buffer station that is determined by the fleet-management system 226. According to some embodiments, virtual buffer stations may be predetermined or static. According, to some embodiments, virtual buffer stations maybe dynamically determined (e.g. in real-time) by the fleet-management system 226 based on available space in the facility 200, and the traffic patterns of vehicles.

The buffer station 320 can be used to allow the vehicle 324b to wait for a period of time in order to maintain the sequence of workpieces. According to some embodiments, the waiting time may be pre-determined and provided to the vehicle 224b by the fleet-management system 226 as part of a mission (e.g. as if there was a pre-determined work period associated with the buffer station 320). According to some embodiments, the vehicle 324b may wait at the buffer station 320 until a signal or trigger is received (e.g. in association with the operation at workstation 312 being completed on the workpiece 322a).

According to some embodiments, the vehicle may not stop or wait at the buffer station 320. Rather, the buffer station 320 may merely represent a delay that can be achieved by reducing the speed of the vehicle 324b from the workstation 310 to the workstation 316. In other words, based on the fact that the sequence of operations for the workpiece 322b requires one workstation fewer than the sequence of operations for the workpiece 322a, the fleet-management system 226 can generate a mission for the vehicle 324b that specifies a speed between the workstation 310 and the workstation 316 that will maintain the proper sequence of finished assemblies, and will prevent the vehicle 324b from arriving at the workstation 318 before the vehicle 324a has vacated.

In this way, the vehicle 324b can be made to arrive at the workstation 316 at approximately the same time as the vehicle 324a is arriving at the workstation 318. Thus, the operation performed on the workpiece 322a at the workstation 318 may be completed at about the same time as the operation performed on the workpiece 322b at the workstation 316 is completed. Subsequently, the workpiece 322a may vacate the workstation 318 in time for the vehicle 324b to arrive according to the sequence of finished assemblies.

In, another example depicted in FIG. 3, each individual work periods may be known for (or associated with) each work station. As used herein, the term "work period" can be used to describe a pre-determined period in which an operation is expected to be completed, or a measured or calculated period for which an operation was actually performed. For example, a pre-determined work period may be specified at one minute, such that each operation is expected to be performed within one minute, and, thus, each minute, a new workpiece is moved to a new workstation. Or, a work-period may be measured or calculated based on the actual time taken to perform the operation historically. According to some embodiments, a work-period may be measured or calculated as an average of more than one iteration of the same operation being performed. According to some embodiments, a work period may be based on or associated with a takt time for the assembly process.

In the example, the work periods for each of the workstations may be measured or calculated, for example, as an average of previous iterations of the operation performed at the workstation. Based on these measured or calculated work periods, the fleet-management system 226 may determine whether a buffer station 320 is necessary, and, if so, how long the delay associated with the buffer station 320 should be. For example, the operation performed at the workstation 316 may typically be performed relatively quickly, for example, because it is a relatively simple operation, and/or because it is being performed by relatively efficient human operators. Since the operation performed at the workstation 316 is performed relatively quickly (i.e. a relatively short work period), the delay associated with the buffer station 320 may be, accordingly, relatively long.

According to some examples, work periods associated with work stations may be measured and recorded every time an operation is performed (or less frequently), and statistics (e.g. averages, means, deviations) may be determined dynamically (e.g. in real time after every operation, or less frequently) by the fleet-management system or enterprise resource management system. According to some embodiments, measured or calculated work periods may be associated with particular human operators and/or particular equipment operating at a workstation.

Figure 4:
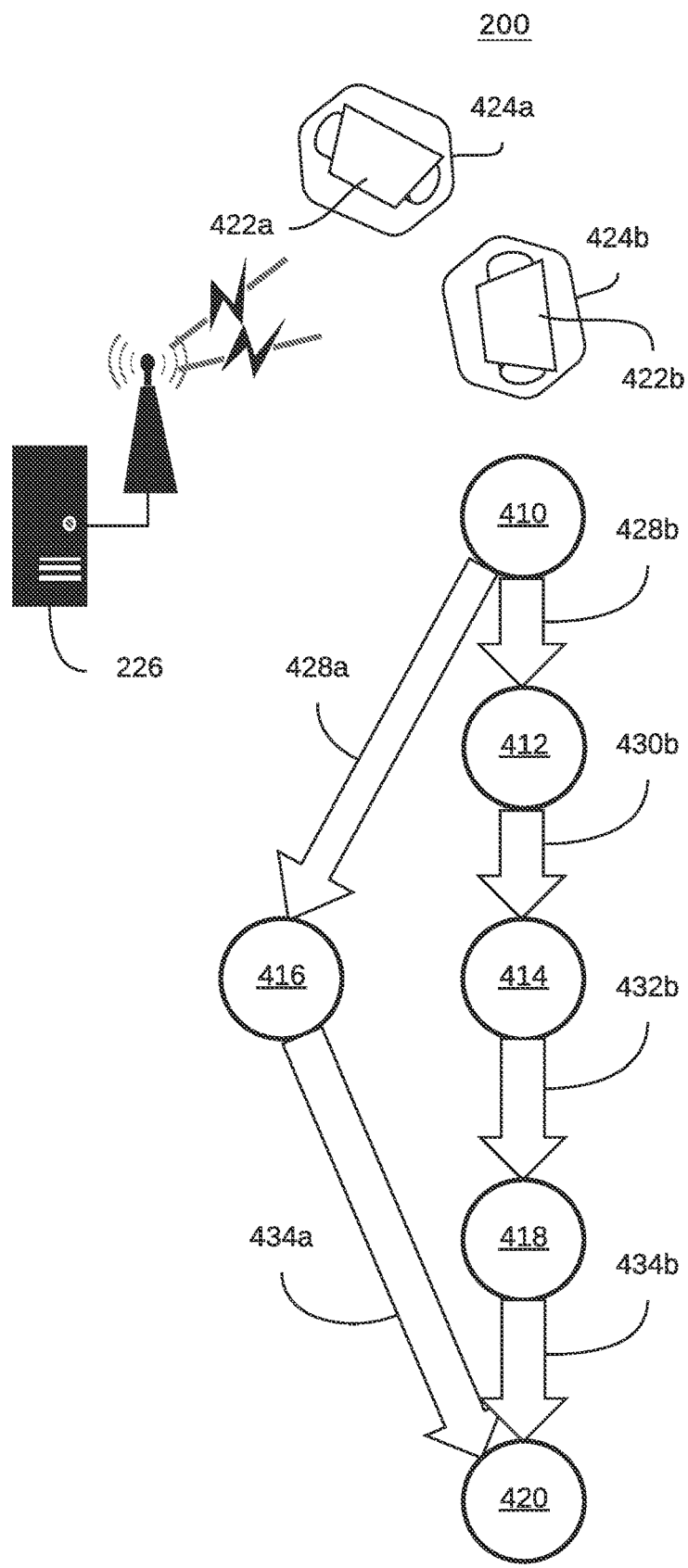
FIG. 4 is a plan view of the assembly facility of FIG. 2 using a system for flexible conveyance according to some embodiments.

Referring to FIG. 4, there is shown the manufacturing facility 200 in which an assembly line has been established by implementing workstations 410, 412, 414, 416, 418, and 420. The assembly line depicted in FIG. 3 may be in addition to the assembly lines depicted in FIG. 2 and FIG. 3. For example, each assembly line may be implemented at the same time, in different areas of the facility 200, and/or one assembly line may be implemented at one time, and then replaced with another assembly line at another time.

In an example depicted in FIG. 4, the fleet-management system 226 has received a sequence of finished assemblies to be produced, which specifies that the workpiece 422a is to be finished ahead of the workpiece 422b. The sequence of operations required to finish the assembly 422a requires that the vehicle 424a convey the workpiece 422a to waypoints associated with the workstations 410, 416, and 420. The sequence of operations required to finish the assembly 422b requires that the vehicle 424b convey the workpiece 422b to waypoints associated with the workstations 410, 412, 414, 418, and 420. In other words, finishing the assembly 422b requires two more workstations than finishing the assembly 422a.

As previously described, the assembly line may operate according to pre-defined work periods for each operation, or measured or calculated work periods may be known for each work station.

Based on the sequence of finished assemblies to be produced, the fleet-management system 226 may determine an assembly-input sequence. According to some embodiments, the assembly-input sequence may be determined based on any or all of the sequence of finished assemblies, the number of operations for a particular assembly, the sequence of operations for a particular assembly, the pre-determined work periods associated with each workstation, the measured or calculated work periods associated with each workstation, the distance between workstations and/or waypoints, and the vehicle-work speed associated with each waypoint or workstation.

As indicated in FIG. 4, the fleet-management system may determine that, in order to achieve a sequence of finished assemblies in which the workpiece 422a is finished ahead of the workpiece 422b, it is necessary, preferred, or optimal to determine an assembly-input sequence in which the vehicle 424b conveys the workpiece 422b into the workstation 410 prior to the vehicle 424a conveying the workpiece 422a into the workstation. For example, based on the work periods or vehicle-work speeds associated with the workstations 412, 414, 416, and 418, and/or the distance between these workstations, and/or any perceived speed limitations for the vehicles as they travel the paths 428a, 428b, 430b, 432b, 434a, or 434b, the fleet-management system 226 may determine that the vehicle 424a will catch up to and pass the vehicle 424b such that the sequence of finished assemblies is achieved out of the workstation 420.

Figure 5:
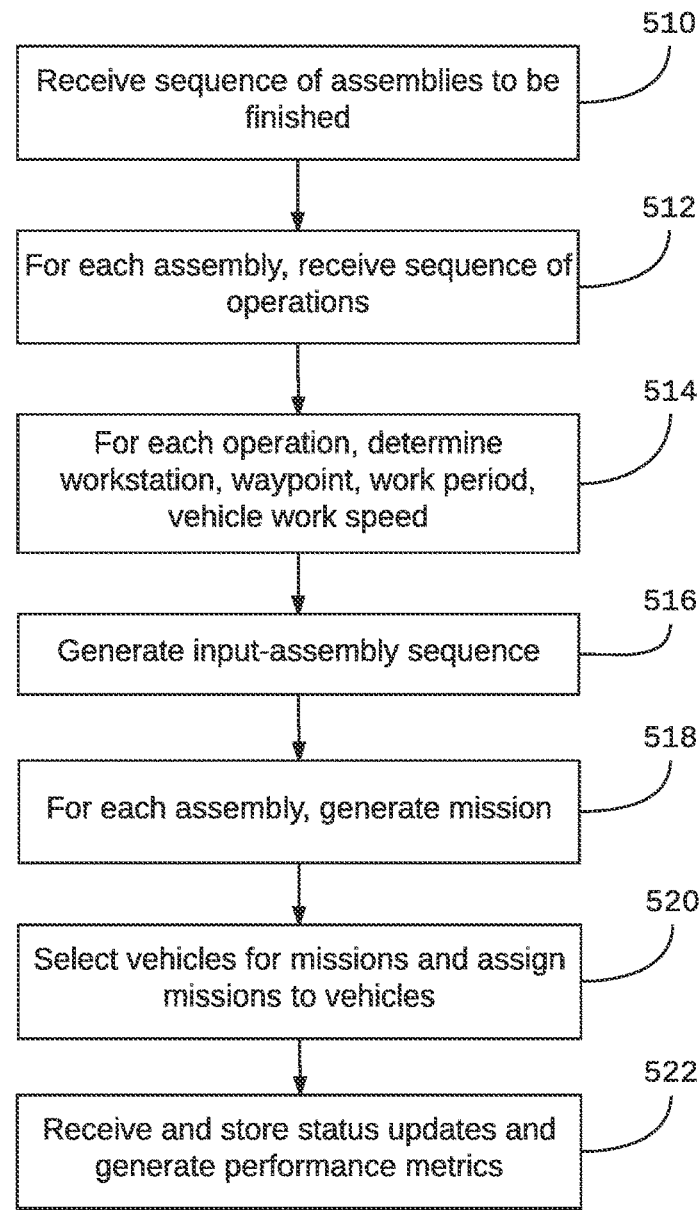
FIG. 5 is a flow diagram of a method for flexible conveyance according to some embodiments.
Figure 6:
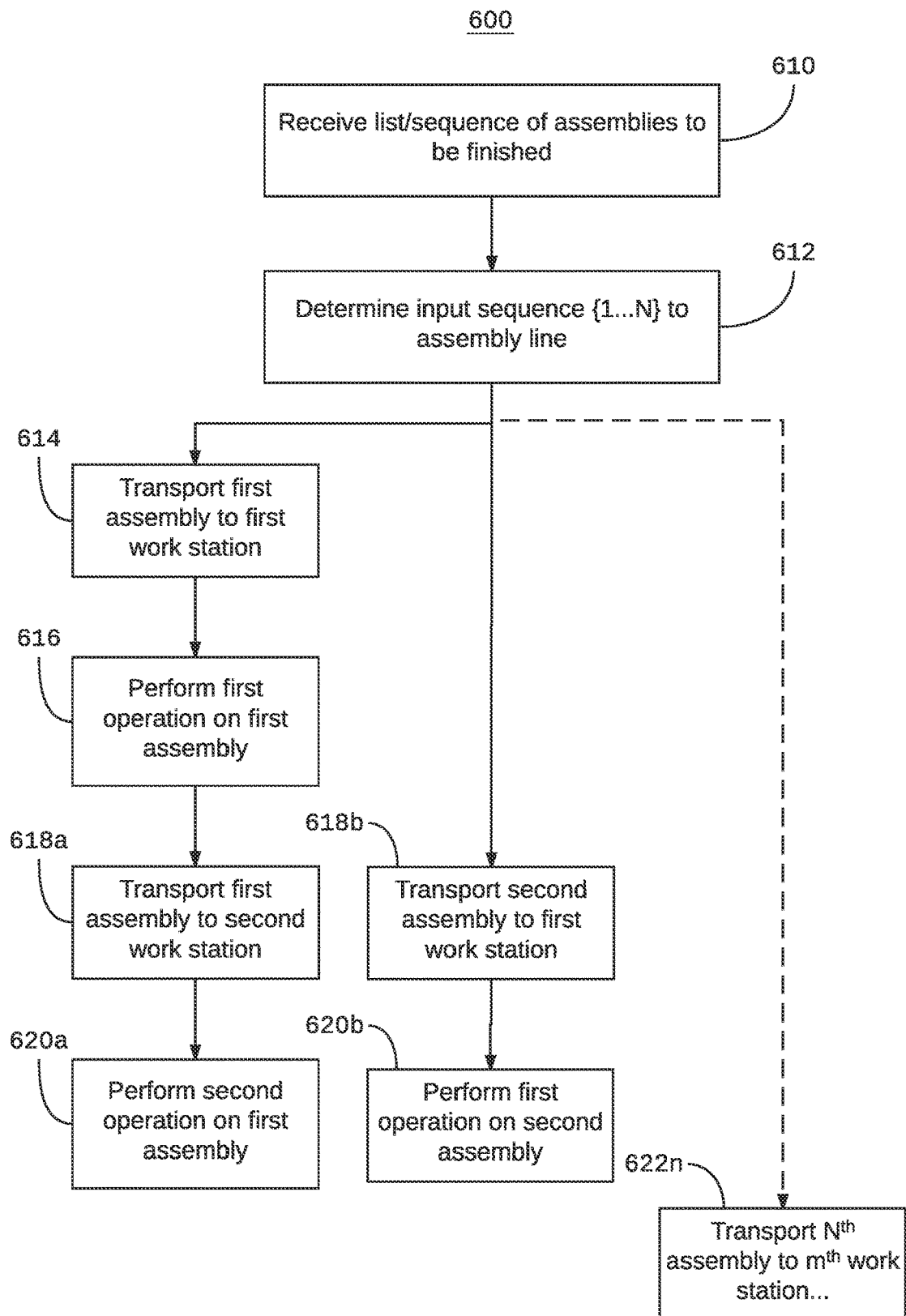
FIG. 6 is a flow diagram of a method for flexible conveyance according to some embodiments.
Figure 7:
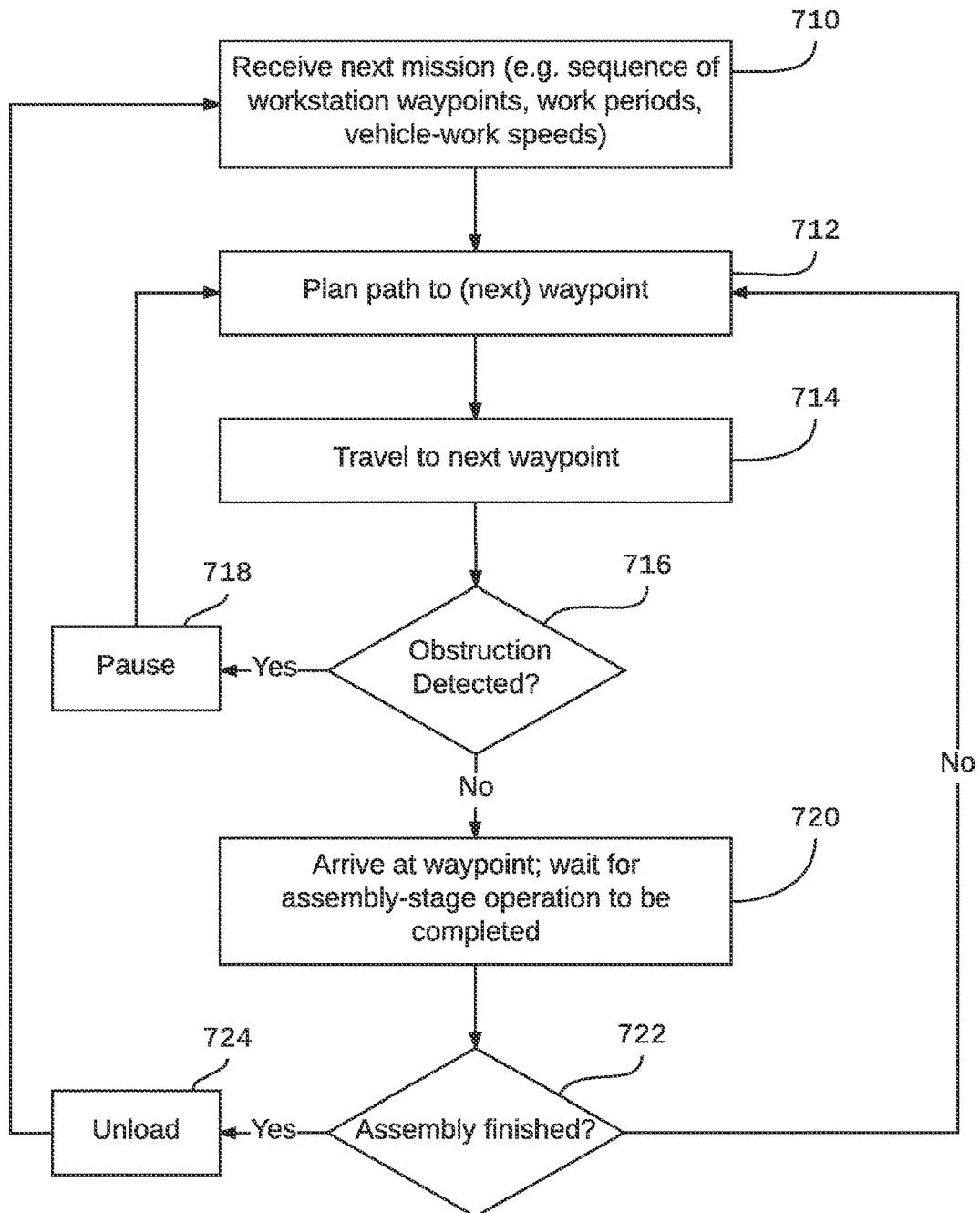
FIG. 7 is a flow diagram of a method for flexible conveyance according to some embodiments.

Referring to FIG. 5 to FIG. 7, there are shown various methods related to flexible conveyance an assembly process. According to some embodiments, these methods may be stored as computer instructions on non-transitory computer-readable media on any or all of a self-driving material-transport vehicle, a fleet-management system, and an enterprise resource planning system. Each of the vehicle, fleet-management system, and enterprise resource planning system include at least one processor and memory such that the computer instructions can be used to configure the processors to execute any or all of the steps of the following methods. According to some embodiments, any or all of the methods 500, 600, and 700 may be run concurrently, sequentially, in parallel, or responsive to each other.

Referring to FIG. 5, there is shown a method 500 for flexible conveyance in an assembly process. According to some embodiments, the method 500 may be performed using a fleet-management system.

The method 500 begins at step 510 when a sequence of finished assemblies is received. According to some embodiments, the sequence of finished assemblies may be received by the fleet-management system from an enterprise resource planning system.

At step 512, a sequence of operations required to produce each finished assembly is received. According to some embodiments, the sequences of operations may be received by the fleet-management system from an enterprise resource planning system.

At step 514, for each operation to be performed on an assembly, any or all of an associated workstation, waypoint, work period, and vehicle-work speed may be determined. According to some embodiments, these may be determined by the fleet-management system based on information stored on the fleet-management system. According to some embodiments, these may be received from the enterprise resource planning system based on an enquiry from the fleet-management system. According to some embodiments, an assembly-input sequence can be determined in order to make optimal, preferred, or convenient use of the assembly process resources, such as the workstations, particular human operators, available parts supply, etc.

According to some embodiments, more than one workstation may be available for a particular operation. In this case, the fleet-management system or enterprise resource planning system may determine a particular workstation for performing the operation, or all workstations capable of performing the operation may be kept in consideration for future steps (e.g. step 516).

At step 516, according to some embodiments, an input-assembly sequence may be determined. As previously described, in some cases, an input-assembly sequence may be determined in order to achieve a desired sequence of finished assemblies, based on, for example, the number of operations to be performed on each assembly.

In some cases, a list of desired finished assemblies may be provided (i.e. but not specified according to a particular sequence). In this case, an input-assembly sequence may be determined in order to make best use of the workstation resources, and minimize the time necessary to produce the list of finished assemblies. For example, based on the number of different types (e.g. variants) of finished assemblies to be produced, and the number and nature of parallel paths or branches in the assembly process, efficiencies may be achieved by specifying an assembly-input sequence.

According to some embodiments, more than one workstation may be available to perform a particular operation. In this case, the selection of a particular workstation to perform the operation on a particular workpiece may be made along with, or as part of, generating the input-assembly sequence. For example, generating the input-assembly sequence may be based on optimize the available combinations of workstations and workpieces.

According to some embodiments, the assembly-input sequence is determined by the sequence in which workpieces are supplied to the assembly process. In other words, in some cases, the fleet-management system may not re-order the input sequence.

At step 518, a mission is generated for each assembly, based on the sequence of operations to be performed on the workpiece that is being conveyed by the vehicle, and the particular workstations that will perform the operations.

According to some embodiments, the mission may be based on, and include information pertaining to any or all of the sequence of operations to be performed, the particular workstations and buffer stations to be used for performing the operations, waypoints associated with the workstations and buffer stations, work periods associated with the workstations, and vehicle-work speeds.

At step 520, a particular self-driving vehicle may be selected from within a fleet of self-driving vehicles, to execute a mission. When a vehicle has been selected, and assigned a mission, the mission may be transmitted to the vehicle from the fleet-management system In turn, each vehicle begins to execute its mission, for example, by planning and travelling along paths from one workstation or waypoint to the next. According to some embodiments, as the vehicles are executing their missions, they may report back to the fleet-management system with status updates. For example, status updates may include information pertaining to work periods, the start and/or completion of particular operations, and traffic conditions experienced along the vehicle's planned paths.

At step 522, status, updates are received from the vehicles (e.g. by the fleet-management system) as the vehicle missions are executed. At step 522, the status updates may be used to generate performance metrics for individual workstations and operations, and the assembly process as a whole. For example, measured or calculated work periods may be determined for each workstation or individual workstation operators, and the overall throughput and efficiency of the assembly process may be monitored. For example, the average work period for a particular workstation, for a particular operation (e.g. as may be performed by more than one workstation), or for a particular human operator or assembly equipment may be calculated and stored so that it can be used in the future planning of sequences of finished assemblies, assembly-input sequences, missions, and assembly-process productivity.

Referring to FIG. 6, there is shown a method 600 for flexible conveyance in an assembly process. According to some embodiments, the method 600 may be performed using a fleet of self-driving vehicles, and, according to some embodiments, with a fleet-management system.

The method beings at step 610 when a list or sequence of assemblies to be finished is received, for example, from an enterprise resource planning system, as previously described.

At step 612, an input sequence may be determined. The example shown in FIG. 6 refers to the production of N assemblies through a sequence of m work stations.

At step 614, a first assembly is transported to a first work station. According to some embodiments, the assembly may be conveyed by a self-driving vehicle that is operating according to a mission received from a fleet-management system, as previously described. According to some embodiments, it is not necessary to include a fleet-management system, for example, since a self-driving vehicle may be pre-programmed to conduct a set mission (e.g. loop through the same sequence of workstations), or a self-driving vehicle may obtain an assembly plan directly in association with the workpiece it is conveying. According to some embodiments, the self-driving vehicle may receive mission updates from a workstation (e.g. be provided with the location of the next workstation or waypoint in the sequence).

At step 616, an operation is performed on the assembly at the first workstation. According to some embodiments, the operation may be performed within a pre-determined work period. According to some embodiments, the work period of the work station may be measured according to the time taken to perform the operation.

According to some embodiments, the operation may be performed while the vehicle conveys the assembly at a vehicle-work speed. For example, during step 614, the vehicle may operate at one speed in order to transport the assembly to the first workstation safely and expediently. During step 616, the vehicle speed may be altered (e.g. slowed) so that an operation can be performed on the assembly while the vehicle continues to move. For example, the operation may be performed by human operators who are walking alongside the vehicle at the vehicle-work speed, and/or the operation may be performed by a machine that the vehicle is driving past, through, or alongside.

At step 618a, when the operation at step 616 has been completed, the first assembly is transported to a second workstation, in a similar manner as described for step 614. At or around the same time, at step 618b, a second assembly is transported to the first workstation, which was recently vacated by the first assembly.

At step 620a, a second operation is performed on the first assembly at the second workstation. At or around the same time, the first operation is performed on the second assembly at the first workstation. That is to say, the second assembly has followed the first assembly in sequence through the first workstation.

The method 600 proceeds iteratively in this manner, and at step 622n, the $N^{th}$ assembly is transported to the $m^{th}$ work station.

Referring to FIG. 7, there is shown a method 700 for flexible conveyance in an assembly process. The method 700 is performed using a self-driving vehicle, and, according to some embodiments, based on a mission received from a fleet-management system.

The method 700 begins at step 710, when a mission is received by the self-driving vehicle. According to some embodiments, the mission may be received from a fleet-management system. According to some embodiments, the mission may be pre-loaded into the vehicle. For example, a particular vehicle may be used to loop through a particular sequence of workstations in order to produce the same finished assembly, without any change in the mission. Generally, the mission comprises a sequence of waypoints associated with workstations. According to some embodiments, the mission may include work periods associated with the workstations, and/or vehicle-work speeds associated with the workstations.

At step 712, the vehicle plans a path to the next waypoint based on the mission. According to some embodiments, the vehicle may plan the path using a control system on the vehicle, which includes a stored map of the vehicle's environment.

At step 714, the vehicle travels to the waypoint according to the planned path. According to some embodiments, the vehicle may travel according to the planned path based on a stored map of the vehicle's environment, and information obtained from the vehicle's sensors.

Generally speaking, as the vehicle is moving, it is constantly or frequently obtaining information from the vehicle's sensors in order to determine whether the vehicle is travelling on the planned path, and whether there are any obstructions on the planned path. The determination of whether there are obstructions on the path is represented by step 716, though, according to some embodiments, step 716 obstruction detection is being done whenever the vehicle is moving.

If, at step 716, it is determined that there is an obstruction in the vehicle's path, then the method 700 proceeds to step 718, and motion of the vehicle is paused. For example, a human operator operating at a work station adjacent the path may step in front of the vehicle, thereby representing an obstruction. According to some embodiments, at step 718, the vehicle pauses until the obstruction is cleared (e.g. the human walks away from the vehicle). According to some embodiments, at step 718, the vehicle alters its course in order to avoid the obstruction.

After step 718, the vehicle returns to step 712 and plans a new path to the waypoint. According to some embodiments, the vehicle may continue to use its previously-planned path, and, thus, the method 700 may effectively return to step 714 from step 718.

According to some embodiments, the duration of time that the vehicle is paused during step 718 can be measured and recorded. Then, when the vehicle returns to step 712 and/or resumes travelling to the waypoint, the vehicle may accelerate to a speed in order to try to make up for the time lost while the vehicle was paused during step 718.

If, at step 716, no obstruction is detected, then the method proceeds to step 720. At step 720, the vehicle arrives at the waypoint, and proceeds with the mission instructions pertaining to that waypoint. According to some embodiments, the vehicle may stop at the waypoint while an operation is performed on an assembly conveyed by the vehicle. According to some embodiments, the vehicle may stop at the waypoint for a pre-determined period of time, or until a trigger or signal is received for the vehicle to continue form the waypoint.

According to some embodiments, the waypoint may generally refer to a region or work period during which the vehicle continues to travel and convey an assembly, while an operation is performed on the assembly.

At step 722, the method 700 considers whether there are more operations to be performed on the assembly being conveyed by the vehicle. If the assembly is not finished, then the method returns to step 712, where it plans the path to the next waypoint associated with the next workstation and operation.

If, at step 722, it is determined that the assembly is finished (i.e. there are no more operations to be performed), then the method proceeds to step 724. At step 724, the assembly may be unloaded from the vehicle.

As such, for the duration of the mission, the vehicle has conveyed the assembly through the assigned sequence of operations, and the assembly is only unloaded after the last operation. Thus, the assembly remains on the self-driving vehicle while the operations are performed. As used herein, it is said that the assembly remains on the vehicle while operations are performed, notwithstanding that particular operations may require that the assembly is temporarily lifted, moved, rotated, etc. during the course of the operation. Thus, even if a particular operation temporarily lifts the assembly off of the vehicle, the vehicle is still said to be continuously conveying the assembly, and the assembly is said to remain on the vehicle while the operation is performed.

The present invention has been described here by way of example only. Various modification and variations may be made to these exemplary embodiments without departing from the spirit and scope of the invention, which is limited only by the appended claims.

The invention claimed is:

1. A method for assembling a workpiece, the method comprising:
    identifying a plurality of workstations that are designated to perform operations corresponding to a sequence of assembly operations for assembling the workpiece;
    determining a set of performance metrics for each workstation of the plurality of workstations based on sensor data received from one or more of one or more self-driving vehicles and one or more sensor systems at the plurality of workstations;
    selecting, from the plurality of workstations, a sequence of workstations for assembling the workpiece based on the set of performance metrics determined for each workstation of the plurality of workstations; and
    generating a mission executable by a self-driving vehicle of the one or more self-driving vehicles transporting the workpiece, wherein the mission comprises a sequence of waypoints corresponding to the sequence of workstations.

2. The method of claim 1, further comprising receiving a request to assemble the workpiece, the request comprising the sequence of assembly operations.

3. The method of claim 1, wherein the sequence of workstations comprises at least one buffer station associated with a waiting time, the waiting time based on the sensor data.

4. The method of claim 1, further comprising determining the sequence of assembly operations based on an indicator located on the workpiece.

5. The method of claim 1, further comprising transmitting the mission to the self-driving vehicle of the one or more self-driving vehicles for execution.

6. The method of claim 1, wherein the sensor data comprises one or more of data relating to work periods associated with the plurality of workstations, data relating to work periods associated with the sequence of assembly operations, a start time and a completion time of an assembly operation and traffic conditions experienced by the one or more self-driving vehicles.

7. The method of claim 1, further comprising:
determining a set of performance metrics for an assembling process associated with each of the one or more self-driving vehicles, based on the sensor data; and
selecting, from the plurality of workstations, the sequence of workstations for assembling the workpiece based on the set of performance metrics determined for the assembling process determined for each of the one or more self-driving vehicles.

8. The method of claim 1, further comprising determining the sequence of assembly operations for assembling the workpiece based on the sensor data.

9. The method of claim 1, wherein the mission comprises a vehicle speed for traveling between a first workstation and a second workstation in the sequence of workstations, the vehicle speed determined based on the set of performance metrics for each workstation.

10. The method of claim 1, wherein each of the one or more self-driving vehicles is executing a corresponding mission and wherein the sensor data received from the one or more self-driving vehicles comprises sensor data obtained while executing the corresponding mission.

11. The method of claim 1, wherein the sequence of workstations is selected to increase the throughput and efficiency of the assembling process for assembling the workpiece.

12. A system for assembling a workpiece comprising:
a plurality of workstations for performing assembly operations; and
a fleet-management system having a processor configured to:
identify at least a subset of workstations of the plurality of workstations that are designated to perform operations corresponding to a sequence of assembly operations for assembling the workpiece;
determine a set of performance metrics for each workstation of the at least subset of workstations, based on sensor data received from one or more of one or more self-driving vehicles and one or more sensor systems at the plurality of workstations;
select, from the at least subset of the workstations, a sequence of workstations for assembling the workpiece based on the set of performance metrics determined for each workstation of the subset of workstations; and
generate a mission executable by a self-driving vehicle of the one or more self-driving vehicles transporting the workpiece, wherein the mission comprises a sequence of waypoints corresponding to the sequence of workstations.

13. The system of claim 12, wherein the processor of the fleet-management system is further configured to determine the sequence of assembly operations based on an indicator located on the workpiece.

14. The system of claim 12, wherein the sensor data comprises one or more of data relating to work periods associated with the at least subset of workstations, data relating to work periods associated with the sequence of assembly operations, a start time and a completion time of an assembly operation and traffic conditions experienced by the one or more of the one or more self-driving vehicles.

15. The system of claim 12, wherein the processor of the fleet-management system is further configured to:
determine a set of performance metrics for an assembling process associated with each of the one or more of the one or more self-driving vehicles, based on the sensor data; and
select, from the at least subset of workstations, the sequence of workstations for assembling the workpiece based on the set of performance metrics determined for the assembling process determined for each of the one or more of the one or more self-driving vehicles.

16. The system of claim 12, wherein the processor of the fleet-management system is further configured to determine the sequence of assembly operations for assembling the workpiece based on the sensor data.

17. The system of claim 12, wherein the mission comprises a vehicle speed for traveling between a first workstation and a second workstation in the sequence of workstations, the vehicle speed determined based on the set of performance metrics for each workstation.

18. The system of claim 12, wherein the sequence of workstations is selected to increase the throughput and efficiency of the assembly process for assembling the workpiece.

19. The system of claim 12, wherein each of the one or more of the one or more self-driving vehicles is executing a corresponding mission and wherein the sensor data received from the one or more of the one or more self-driving vehicles comprises sensor data obtained while executing the corresponding mission.

20. The system of claim 12, wherein the processor is configured to receive a request to assemble the workpiece from an enterprise resource management system, the request comprising the sequence of assembly operations.

* * * * *

UNITED STATES PATENT AND TRADEMARK OFFICE
CERTIFICATE OF CORRECTION

| | | |
|---|---|---|
| PATENT NO. | : 11,687,096 B1 | Page 1 of 1 |
| APPLICATION NO. | : 18/079442 | |
| DATED | : June 27, 2023 | |
| INVENTOR(S) | : Ryan Christopher Gariepy et al. | |

It is certified that error appears in the above-identified patent and that said Letters Patent is hereby corrected as shown below:

In the Specification

Column 1, Line 9:
"14/153,133"
Should read:
-- 17/153,133 --

Column 6, Line 20:
"'la'"
Should read:
-- 'b' --

Signed and Sealed this
Fifteenth Day of August, 2023

*Katherine Kelly Vidal*

Katherine Kelly Vidal
*Director of the United States Patent and Trademark Office*